United States Patent
Teder

[19]

[11] Patent Number: 6,124,691
[45] Date of Patent: Sep. 26, 2000

[54] MOISTURE SENSOR WITH PRE-DEMODULATION GAIN AND HIGH-ORDER FILTERING

[75] Inventor: Rein S. Teder, Bloomington, Minn.

[73] Assignee: Libbey-Owens-Ford Co., Toledo, Ohio

[21] Appl. No.: 09/318,456

[22] Filed: May 25, 1999

[51] Int. Cl.[7] .................................................. G05B 5/00
[52] U.S. Cl. .......................... 318/483; 318/444; 318/480; 318/DIG. 2; 15/250 C; 15/250.12; 15/250.16; 15/250.17
[58] Field of Search ..................... 318/483, 444, 318/480, DIG. 2; 15/250 C, 250.12, 250.16, 250.17

[56] References Cited

U.S. PATENT DOCUMENTS

| | | |
|---|---|---|
| 4,355,271 | 10/1982 | Noack . |
| 4,481,450 | 11/1984 | Watanabe et al. . |
| 4,760,272 | 7/1988 | Wang . |
| 4,798,956 | 1/1989 | Hochstein ............................ 318/444 |
| 4,867,561 | 9/1989 | Fujii et al. . |
| 4,916,374 | 4/1990 | Schierbeek et al. . |
| 4,956,591 | 9/1990 | Schierbeek et al. . |
| 4,987,354 | 1/1991 | Steinmann . |
| 5,059,877 | 10/1991 | Teder . |
| 5,140,233 | 8/1992 | Wallrafen . |
| 5,557,040 | 9/1996 | Inenaga et al. ........................ 318/483 |
| 5,568,027 | 10/1996 | Teder . |
| 5,760,711 | 6/1998 | Inenaga et al. ........................ 340/962 |

*Primary Examiner*—Karen Masih
*Attorney, Agent, or Firm*—Marshall & Melhorn

[57] ABSTRACT

A moisture sensor for detecting moisture on the surface of a transparent material. The moisture sensor includes one or more emitters for producing moisture sensing signals which are influenced by moisture on the transparent material, and one or more detectors for receiving the moisture sensing signals and producing a detector output signal. The moisture sensor further includes a pre-demodulation gain and filtering circuit having high order filtering for removing most of the unwanted ambient light noise and EMI interference from the detector output signal for the accurate detection of moisture in the presence of noise.

8 Claims, 4 Drawing Sheets

MOISTURE SENSOR WITH PRE-DEMODULATION GAIN AND HIGH-ORDER FILTERING

BACKGROUND OF THE INVENTION

The present invention relates generally to an optical moisture sensor for detecting moisture on the surface of a transparent material, and more particularly, to a moisture sensor having wide bandwidth, high order pre-demodulation filtering for reducing the effects of unwanted noise components.

The accumulation of moisture on transparent materials, such as glass or Plexiglass, can obstruct a person's view through the material. Motor vehicles have long been equipped with motor-driven windshield wipers for clearing the moisture from the external surface of the windshield, at least within the driver's field of vision, and generally over a larger area so as to enhance one's vision through the windshield.

In most vehicles today, the windshield wiper system includes multi-position or variable speed switches which allow the driver to select a wide, if not an infinitely variable, range of speeds to suit conditions. Wiper controls are manually operated and typically include a delay feature whereby the wipers operate intermittently at selected time delay intervals.

Wiper control systems have recently been developed which include a moisture sensor mounted on one of the vehicle windows to automatically activate the wiper motor when moisture is deposited upon the surface of the window. The wiper control system including the moisture sensor are most typically mounted on the windshield, although the system may be mounted on the rear window or any other glass surface intended to be cleared of moisture. Such wiper control systems free the driver from the inconvenience of frequently adjusting the wiper speed as the driving conditions change.

Optical moisture sensors operate upon the principle that a light beam is diffused or deflected from its normal path by the presence of moisture on the exterior surface of the windshield. Typical optical moisture sensors include an emitter for emitting a light signal (hereinafter called a moisture sensing signal) which is preferably an infrared radiation signal. The moisture sensing signal is directed towards a moisture detection region on the windshield where it is reflected back by the outer surface of the windshield and into a detector. The presence of moisture on the surface of the windshield reduces the amplitude of the reflected signal. The detector converts the reflected moisture sensing signal to a pulsatile electrical signal which is then demodulated to provide a signal representing the amount of moisture in the moisture detection regions.

Bright sunlight presents a difficult working environment for an optical moisture sensor. The semiconductor emitters used in most optical moisture sensors generate a few milliwatts of optical energy. Yet, a commercially viable moisture sensor must operate day or night and should be able to sense very small droplets of moisture which only provide a very small shift in the received signal level within the moisture sensor. Sunlight impinges upon the surface of the earth with roughly 1000 watts of optical energy per square meter. The sunlight provides a broad bandwidth of intense ambient light noise which interferes with the operation of the moisture sensor.

To compensate for the ambient light, moisture sensors typically use costly optical systems designed to exclude as much ambient light as possible from the moisture sensing signal. However, it is desirable to provide a moisture sensor having an inexpensive optical system.

Some moisture sensors use electronic filters to remove the unwanted ambient light from the received moisture sensing signal as taught by the Noack (in U.S. Pat. No. 4,355,271). Noack shows a moisture sensor having a detector with an output that is connected to a first order high pass filter. The filter rejects the low frequency noise components of the signal from the detector, and provides gain to the signal before it is demodulated. However, the first order filter taught by Noack attenuates frequencies below the cutoff frequency of the filter at a relatively gradual 20 dB per decade. The gradual attenuation of the filter still allows a significant amount of ambient light noise to be present in the received moisture sensing signal when it is demodulated. The ambient light noise still creates problems with the operation of the moisture sensors in bright sunlight when shadows cause the false detection of moisture. It is desirable to reduce the false detection of moisture by shadows on bright sunny days.

Vehicle moisture sensors should be able to be used on many different windshields having different transmittances. The transmittance of the windshield glass affects the amount of light which will pass through the glass which determines the strength of the reflected emitter signal reaching the detector. For example, modern solar-control windshields, such as windshields sold under the trademark "EZ-KOOL" commercially available from Libbey-Owens-Ford Co., absorb much of the infrared energy used by many optical moisture sensors drastically reducing the strength of the reflected emitter signal. Therefore, it is desirable produce a high intensity moisture sensing signal so that the signal reaching the detector will have a sufficient intensity to provide a useable signal. Furthermore, it is desirable to produce a high intensity emitter signal to overcome the noise created by ambient light.

The intensity of the emitter signal is determined by the amount of electrical energy provided to the emitter. However, typical emitters have a limited power capacity. A larger amount of energy, typically in the form of current pulses, can be provided to the emitter for a shorter duration without surpassing the average power capacity of the emitter. The current pulses produce a pulsatile emitter signal having sufficient intensity. The pulsatile emitter signal is said to have a low duty cycle in which the signal pulses are relatively short in duration as compared to the rest of the signal interval. It is desirable to provide an inexpensive moisture sensor with a low duty cycle moisture sensing signal having filters which capture as much of the useful moisture sensing signal as possible while rejecting more of the ambient noise to improve the sensor's moisture detection capabilities.

SUMMARY OF THE INVENTION

A moisture sensor for detecting moisture on the surface of a transparent material. The moisture sensor includes one or more emitters for producing moisture sensing signals which are influenced by moisture on the transparent material, and one or more detectors for receiving the emitter signals and producing a detector output signal.

The moisture sensor further includes a pre-demodulation gain and filtering circuit for removing most of the unwanted signal components including noise from ambient light and EMI. High order band pass filtering is used to sharply attenuate the ambient light noise while passing almost all of the useful moisture sensing signal contained in the detector output signal. A demodulation circuit creates a dc signal for indicating the presence of moisture.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
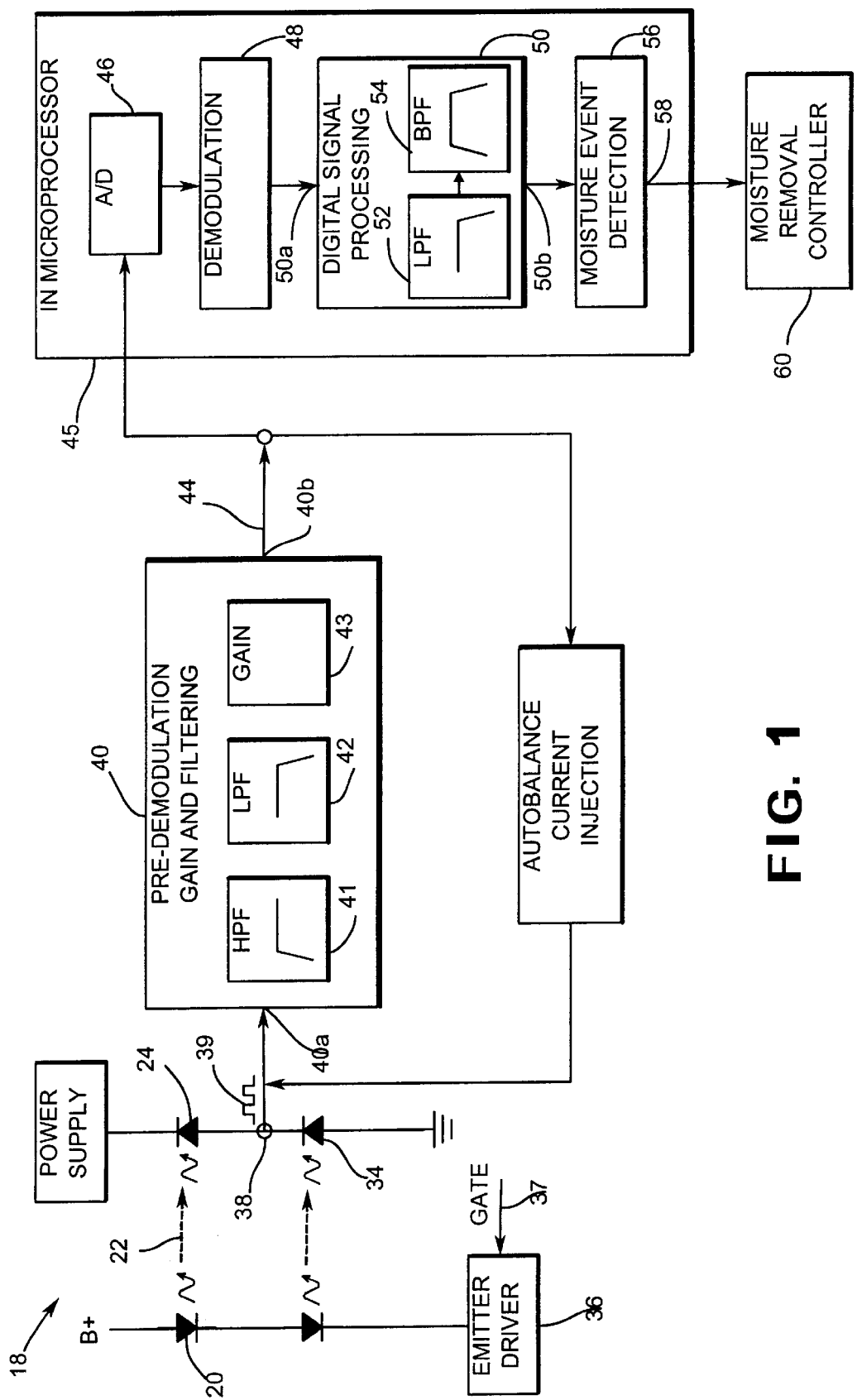
FIG. 1 is a block diagram of the moisture sensor including the pre-demodulation gain and filtering in accordance with the invention.

Referring to FIG. 1, a block diagram of the moisture sensor 18 of the present invention is illustrated. The preferred embodiment of the moisture sensor 18 includes a pair of signal emitters 20 providing moisture sensing signals 22, preferably infrared radiation, to a pair of detectors 24. The signal emitters 20 are preferably infrared light-emitting diodes, although any suitable signal emitters may be used. The detector 24 is preferably a photodiode, although any suitable detector for receiving the moisture sensing signal 22 may be used.

An emitter driver 36 is connected to the emitters 20 for providing power to the emitters in an amount which determines the amplitude or intensity of the moisture sensing signals 22. A periodically repeating gate signal pulse 37 is applied to emitter driver 36 as described below.

The detectors 24 are coupled with the emitters 20 by an optical system (not shown) for receiving at least a portion of the moisture sensing signals 22, and they respond by producing individual detector signals (not shown). The detectors 24 are connected to a common node 38 where the detector signals are combined to produce a detector output signal 39.

During operation of the moisture sensor, the emitter 20 emits an infrared moisture sensing signal 22 which strikes the outer surface of the glass 20 at a sensing region (not shown) where the presence of moisture can be detected. The moisture sensing signal 22, or at least a portion of it, is then reflected back through the glass and is received by the detector 24.

If moisture has accumulated on the windshield in the sensing region, the moisture sensing signal 22 received by the detector will indicate such with a change in amplitude. The detectors 24 produce a signal 39 comprising the received moisture sensing signal which is representative of the moisture detected.

Figure 2:
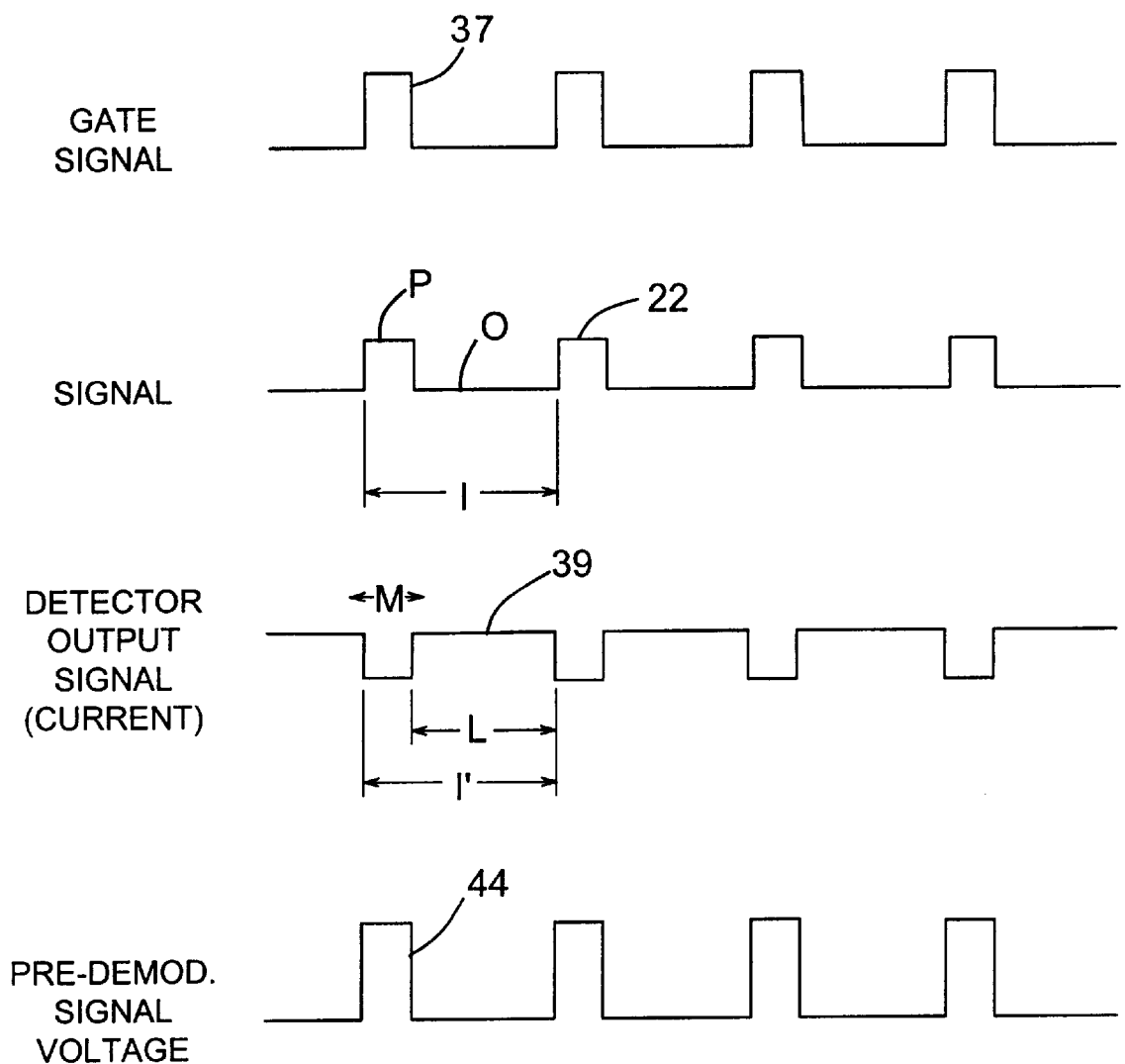
FIG. 2 is a graph illustrating the moisture sensor signals for the moisture sensor illustrated in FIG. 1.

Referring now to FIG. 2, the periodically repeating pulsed gate signal 37 received by the emitter driver 36 is illustrated. The gate signal pulses 37 preferably have a 50-microsecond duration, and are repeated at a frequency of 1200 Hz, although any suitable duration and frequency may used. The emitter driver 36 is preferably a current source which responds to each gate signal pulse 37 by providing a pulse of current to the emitters 20.

The emitters 20 respond to each current pulse by producing the pulsed moisture sensing signals shown at 22. In the preferred embodiment, the moisture sensing signal 22 is a pulsed infrared signal comprising a plurality of repeating signal intervals I. Each signal interval I has a duration of approximately 833 microseconds based on the gate signal pulse frequency of 1200 Hz described above, although any suitable frequency and duration may be used.

Each signal interval I comprises a pulse of infrared light shown by P, and a portion during which the emitter is off shown by O. The duty cycle of the moisture sensing signal is the percentage of the signal interval I during which the emitter 20 is on. The preferred duty cycle of the present invention is therefore approximately 6%, although any low duty cycle can be used. A low duty cycle is defined as a duty cycle less than 25%, and preferably less than 15%.

The detectors 24 allow current to flow in an amount proportional to the strength of the reflected moisture sensing signals 22 they receive. The detector currents (not shown) are combined at node 38 to produce the detector output signal shown at 39. The detector output signal 39 includes a signal interval I' which is similar to the signal interval I described above. The detector output signal interval I' includes a portion M corresponding to the received moisture sensing signal which includes information about the moisture in the moisture detection regions as well as the effects of ambient light striking the detectors. Each detector signal interval I' also has a light signal portion L when the emitters are not operated which includes the effects of the ambient light. The pulsatile detector output signal has the same fundamental frequency as the moisture sensing signal which is 1200 Hz in this example. In addition to the fundamental frequency, the pulsatile detector output signal also includes signal components from harmonics of the fundamental frequency. The harmonics, which extend upwards in frequency from the fundamental frequency, include useful signal information about the moisture which was detected.

Referring again to FIG. 1, the detector output signal 39 is coupled to the input 40a of a high gain, wide bandwidth pre-demodulation amplifier and filter circuit 40 to remove the undesirable signal components. The pre-demodulation amplifier and filter circuit 40 includes high pass filtering 41 for reducing effects of the ambient light disturbances by rejecting low frequency signal components of the detector output signal 39. The high pass filter 41 is preferably a fifth order filter having a corner frequency of approximately 1 kHZ for sharply attenuating the low frequency disturbances while passing most of the moisture sensing portion M of the detector output signal 39 including the signal components from the harmonics described above. However, any suitable order high pass filter having any suitable corner frequency may be used.

The pre-demodulation amplifier and filter circuit 40 also includes low pass filtering 42 for rejecting high frequency noise such as electromagnetic interference and random recombination of electrons and holes in the photodiode detectors 24. The low pass filter 42 is preferably a second order filter having a corner frequency of 33 KHZ for attenuating the high frequency disturbances while passing most of the energy present in the detector output signal 39. However, any suitable order low pass filter having any suitable corner frequency may be used.

The preferred embodiment of the pre-demodulation gain and filtering circuit 40 uses multistage filters including two bandpass filters and three high pass filters (not shown) to achieve the fifth order high pass and second order low pass filters. However, any suitable combination of filters may be used. Operational amplifiers, resistors and capacitors (not shown) are configured in a known manner to form the filters 41, 42.

The pre-demodulation amplification and filter circuit 40 also includes a gain stage 43 for amplifying the detector output signal 39. The gain is preferably supplied to detector output signal 39 by the multistage filter described above. The first stage of the multistage filter is preferably configured as a transimpedance amplifier, although any known signal amplifier may be used.

The pre-demodulation circuit 40 converts the pulsatile detector output current signal 39 into a filtered, amplified pulsatile pre-demodulation voltage signal 44 as shown in FIG. 2. The pre-demodulation signal 44 is sent from the pre-demodulation circuit output 40b to a microcomputer 45. The microcomputer 45 is preferably an 8-pin device, number PIC12C672 manufactured by Microchip Corporation, although any suitable microcomputer may be used.

The microcomputer 45 includes an analog to digital converter 46 which converts the analog pre-demodulation voltage pulses 44 to digital form for further processing by the microcomputer 45. The analog to digital converter 46 is preferably an 8-bit converter having a resolution a approximately 20 mV, although any suitable analog to digital converter having any suitable resolution may be used.

The digital signal is then demodulated in a demodulation stage 48 which demodulates the pulsatile signal to form a dc signal 49 having an amplitude which represents the moisture detected by the sensor. Software within the microcomputer samples the sensed signal twice in rapid succession, once during the moisture sensing portion M of the signal interval I when the moisture sensing signal and the concomitant ambient light disturbances are present, and once during the light signal portion L of the signal interval I when just the ambient light signal is present. The effects of the ambient light disturbances are linearly subtracted through the software realization of a time-shifted linear differential amplifier, as taught by Teder in U.S. Pat. No. 5,059,877 which is incorporated herein by reference.

The output of the demodulation stage 48 is connected to the input 50a of a Digital Signal Processing (DSP) filter stage 50. The DSP filter stage 50 includes a Low Pass Filter 52 and a Bandpass Filter 54. The DSP stage output 50b is connected to a moisture event detection stage 56 which uses event detection software, preferably taught by Teder in U.S. Pat. No. 5,348,027 which is incorporated herein by reference, to produce an output signal at 58 that indicates the presence of moisture on the glass surface.

The output signal 58 of the moisture event detection stage 56 is connected to a moisture removal controller 60 which is preferably a vehicle wiper control unit. The vehicle wiper control unit includes a microcomputer capable of using the moisture event detection signals to control the windshield wipers in response to moisture present on the glass.

Figure 3:
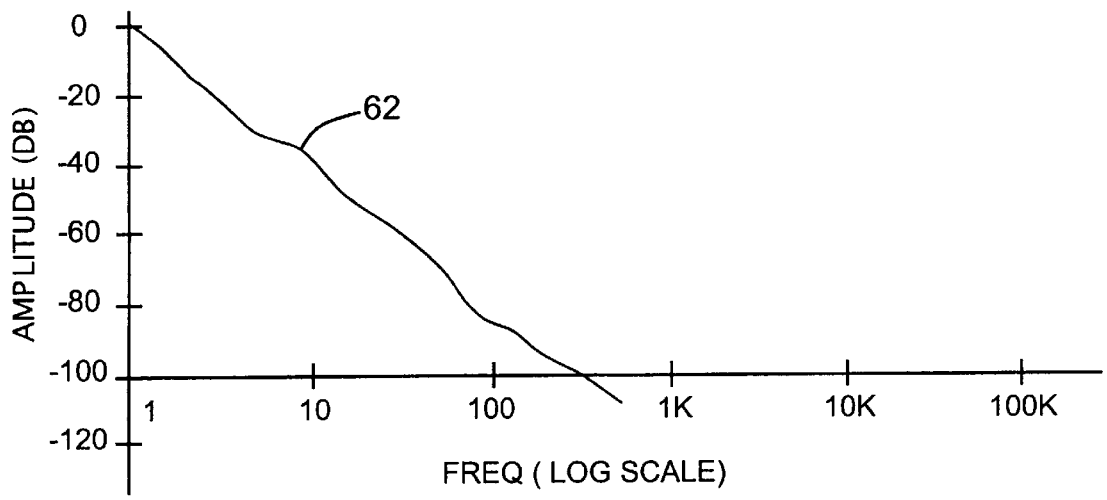
FIG. 3 is a graph of the spectral response of the ambient light noise for an optical moisture sensor for use on a vehicle windshield.

After thoroughly investigating the spectral characteristics of the ambient light noise for an optical moisture sensor for use on a vehicle windshield, it has been found that the spectral response of the noise is predominantly low frequency in nature and extends into the tens of hertz range. Referring now to FIG. 3, the spectral characteristic of the ambient light noise acting upon an optical moisture sensor for use on a vehicle windshield is shown generally at 62. The spectral characteristic has been normalized to zero dB at one hertz.

It has been found that movement of the vehicle through shadows, particularly on a sunny day, causes the ambient light level striking the moisture sensor to fluctuate. The fluctuating light levels create ambient light noise which varies in amplitude and in frequency. Large objects, such as bridges and buildings, in direct sunlight cause the largest changes in ambient light level to strike the moisture sensor. These objects cause low frequency ambient light disturbances of high amplitude, on the order of a few Hertz. However, smaller objects, such as tree branches and telephone poles, cast shadows that the vehicle drives through much more rapidly. These shadows are not as dark as the large objects and, thus, the smaller objects give rise to ambient light noise that is smaller in magnitude, but higher in frequency. These higher frequency disturbances are on the order of a few tens of Hertz. It has been found that the ambient light energy typically decreases at the rate of about 20 dB per decade of increase in frequency as shown by the spectral characteristic at 62.

The ambient light noise created by the sun is extremely strong, therefore, the amplitude of the noise must be decreased significantly to accurately detect the moisture sensing signal. To effectively remove the ambient light noise, the moisture sensor must attenuate most of the ambient light noise and pass most of the energy of the received moisture sensing signal pulses.

Figure 4:
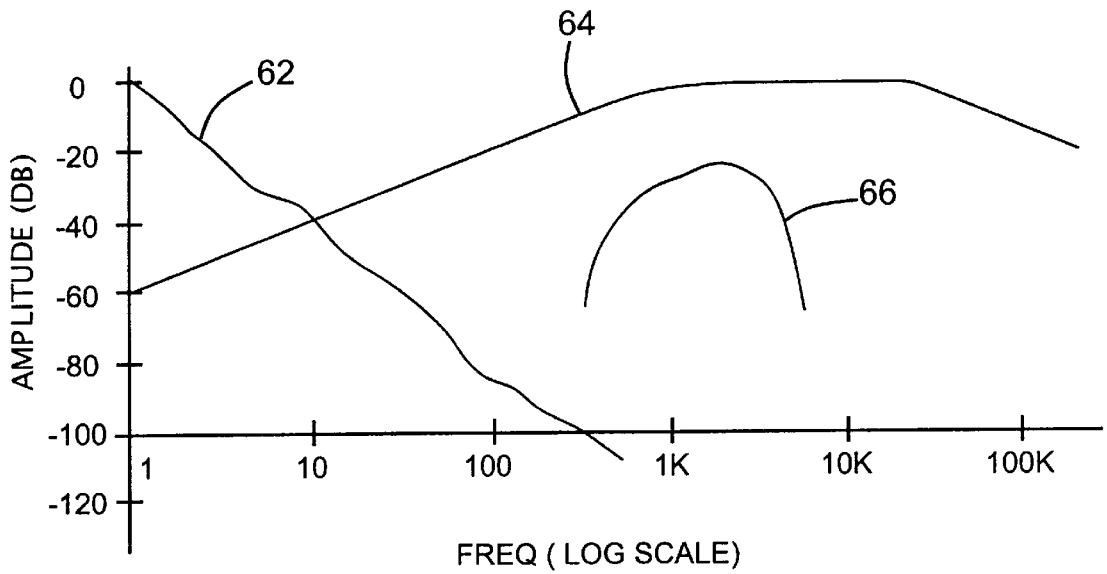
FIG. 4 is a graph of the spectral characteristics of a prior art moisture sensor having pre-demodulation filtering.

Referring now to FIG. 4, the filter spectral characteristics of a prior art moisture sensor having modest pre-demodulation filtering are shown at 64. The spectral characteristics of a low duty cycle moisture sensing signal are shown at 66. The prior art moisture sensor uses a first order filter to provide attenuation of the ambient light noise of 20 dB per decade. With a first order filter, however, it is not possible to select a cutoff frequency that passes almost the entire desired signal 66, yet rejects almost the entire noise signal 62. For example, the low order filter having a corner frequency of 1 kHz only attenuates the ambient light noise at 10 Hz by 40 dB, or a voltage factor of 100. Because the effects of the sun are so strong, the remaining ambient light disturbances can still be sufficient to disrupt operation of the moisture sensor.

Figure 5:
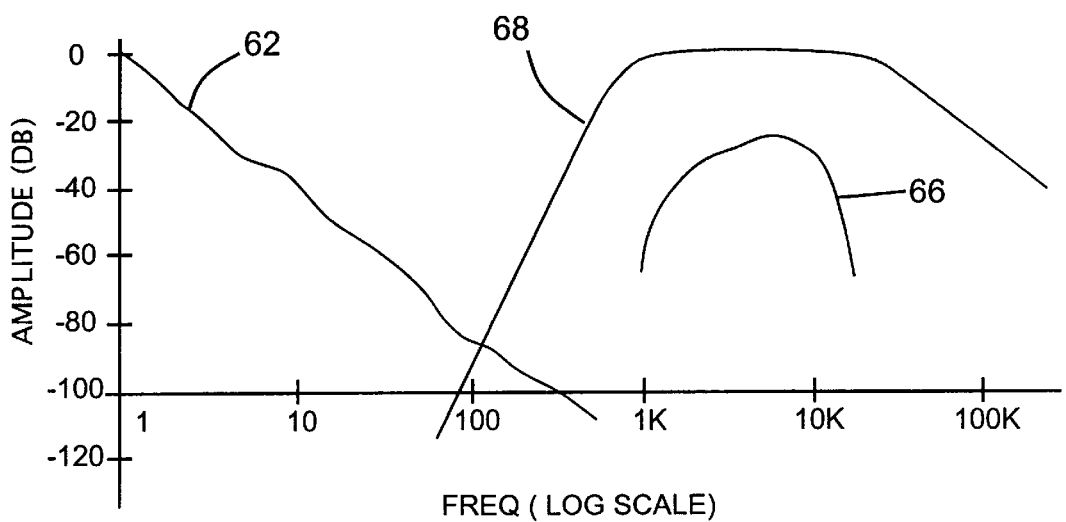
FIG. 5 is a graph of the spectral characteristics of the present invention showing the effects of high-order predemodulation filtering.

Referring to FIG. 5, the spectral response of the filtering of the present invention is shown at 68. The pre-demodulation filtering uses high order, high pass filtering which significantly attenuates the ambient light noise. The high order filter preferably uses a fifth order high pass filter in combination with a second order low pass filter to achieve band pass filter as described in detail below. The band pass filter sufficiently attenuates the ambient light noise before demodulation to accurately detect moisture on a sunny day.

The band pass filter must have a frequency response that extends up to about 33 kHz to capture most of the energy in the harmonics of the low duty cycle moisture sensor signal pulses described above. A lower upper limit of frequency response would tend to discard the energy present in the received moisture sensor signal pulses. A higher limit would decrease the immunity of the system to EMI, and would pass more noise from the photodiode detector.

The slope of the high-pass filter is a very sharp 100 dB per decade. The selection of the corner frequency depends on the frequency of the moisture sensing signal and the duty cycle. The high order high pass filter therefore loses only a few percent of the energy of moisture sensor signal pulses. Low frequency events, such as those induced by light disturbances, are attenuated severely. For example, ambient light disturbances of 10 Hz are attenuated by over 120 dB, or a voltage factor of over one million. Any increase in the HPF frequency will cause the system to discard some of the desired received signal. Any decrease in HPF frequency would allow more low frequency noise to pass through the system. A resonant filter, regardless of filter slope, is not suitable for this application since a resonant filter has a relatively narrow pass band characteristic which will not pass all of the useful moisture sensing signal including the harmonics of the low duty cycle signal while attenuating the unwanted noise components mentioned above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A moisture sensor for detecting moisture on the surface of a transparent material and controlling the actuation of a moisture removal system accordingly, said moisture sensor comprising:

an emitter for generating a low duty cycle pulsatile moisture sensing signal which is influenced by the presence of moisture on the surface of the transparent material;

a detector for receiving said pulsatile moisture sensing signal and contributing to the production of a pulsatile detector output signal having a fundamental frequency and signal components including harmonics of said fundamental frequency;

a pre-demodulation circuit connected to said detector and including an input for receiving said pulsatile detector output signal and an output for providing a pulsatile pre-demodulation signal, said pre-demodulation circuit further including an amplifier for providing gain to said pulsatile pre-demodulation signal and a band-pass filter connected to said input for attenuating unwanted low frequency ambient light noise signal components and passing most of the useable signal information from said pulsatile detector output signal including most of said harmonics; and a demodulation circuit for converting said pulsatile pre-demodulation signal to a dc signal for indicating the presence of moisture on the surface of the transparent material.

2. The moisture sensor defined in claim 1 wherein said band-pass filter includes a high-order high pass filter and a low pass filter.

3. The moisture sensor defined in claim 2 wherein said high-order high pass filter has a filter order of at least 3.

4. The moisture sensor defined in claim 3 wherein said high-order high pass filter has a filter order of 5.

5. The moisture sensor defined in claim 2 wherein said high-order high pass filter attenuates said low frequency ambient light noise signal components from said detector output signal in excess of 70 dB.

6. The moisture sensor defined in claim 5 wherein said high-order high pass filter attenuates said low frequency ambient light noise signal components below 10 Hz in excess of 100 dB.

7. The moisture sensor defined in claim 2 wherein said high-order high pass filter includes three cascaded filters.

8. The moisture sensor defined in claim 1 wherein said pre-demodulation circuit amplifier provides in excess of 30 dB of gain to said pulsatile pre-demodulation signal.

* * * * *